United States Patent Office 2,958,715
Patented Nov. 1, 1960

2,958,715

TERTIARY AMYLENE RECOVERY USING SULFURIC ACID AND HYDROCARBON EXTRACTANTS

Robert A. Sanford, Homewood, and Seymour H. Patinkin, Chicago, Ill., assignors to Sinclair Refining Company, New York, N.Y., a corporation of Maine No Drawing. Filed Apr. 7, 1960, Ser. No. 20,527

7 Claims. (Cl. 260—677)

This application is a continuation-in-part of our application Serial No. 701,699, filed December 10, 1957, now abandoned.

This invention pertains to an improved process for the recovery of tertiary olefins from hydrocarbon streams containing the same. More particularly, this invention concerns the recovery of the tertiary olefin isomers of isoamylene from fat mineral acid extracts by contact with liquid paraffinic or olefinic hydrocarbons and thereafter distilling the isoamylenes from the hydrocarbon extractant.

It is generally known in the art that the $C_5$ tertiary olefins can be removed from hydrocarbon streams containing the same and other $C_5$ hydrocarbons such as paraffins by contacting the stream with sulfuric acid of 50–70% by weight concentration and at low temperatures. The tertiary $C_5$ olefins thus selectively extracted into the acid phase are usually recovered by dilution of the acid to about 40–45% concentration followed by steam stripping or distillation. If the sulfuric acid is not diluted to a sufficient extent the heat in the distillation step will cause undue polymerization of the iso-olefin. The principal disadvantage of this process is the expense and time consumed in handling and reconcentrating the diluted lean sulfuric acid prior to recycling it back to the acid extraction unit. The recovery process of the present invention overcomes this prior difficulty of acid reconcentration.

It is to be understood that the present recovery process is applicable to only two of the three isomers of isoamylene, namely 2-methylbutene-1 and 2-methylbutene-2, the third isomer 3-methylbutene-1 remaining insoluble in the sulfuric acid employed in the acid extraction process. The tertiary iso-olefin, isobutylene, although absorbed from the hydrocarbon stream by the preferred sulfuric acid concentration cannot be removed from the fat acid by the present method of hydrocarbon separation. The higher iso-olefins ($C_7$ and above) are not absorbed at the preferred acid strengths nor are normal amylenes, other normal olefins or isoprene.

In accordance with this invention, we have discovered that the tertiary isoamylenes selectively absorbed in sulfuric acid of about 50–75% by weight concentration can be recovered therefrom with a minimum of polymerization and without the necessity of diluting the fat sulfuric acid by contacting the fat acid with a liquid hydrocarbon solvent having a boiling point sufficiently above that of the isoamylenes so that the isoamylenes can be removed therefrom by distillation.

The extraction of tertiary olefins, such as the 2-methyl- butene-1 and 2-methylbutene-2 isomers of isoamylene, with sulfuric acid can be accomplished by single batch extraction or in a continuous manner by passing the hydrocarbon stream countercurrently to the acid. Such a hydrocarbon stream can be obtained as a $C_5$ side cut from the distillation of the product resulting from the catalytic cracking of petroleum gas oil, and this $C_5$ cut will generally be comprised of about 20 to 50% of the above two isomers of isoamylene, small amounts of the third isomer, (3-methylbutene-1), n-pentene and saturated $C_5$ hydrocarbons. The conditions for such an extraction step are usually such that large amounts of the desired hydrocarbons are shifted into the acid phase without undergoing undue polymerization. Generally the acid will be of about 50–75% by weight concentration and preferably of about 60–65% by weight. Since higher temperatures will enhance the polymerization of the iso-olefins the temperature must usually be limited to approximately room temperature or slightly over, i.e. about $-10°$ C. up to about 30° C. or 50° C. with the preferred temperature being in the range of about 10° to 20° C. The time necessary to shift the tertiary olefins to the acid phase is dependent upon the efficiency of stirring and the temperature employed, usually about 5 to 30 minutes sufficing. The hydrocarbon/acid ratio in such an extraction process is generally about 0.5 to 5:1 and preferably it should be maintained at about 1.0 to 2:1.

The fat mineral acid extract obtained as outlined above will usually contain about 10 to 40% by weight of the tertiary isoamylenes and preferably the conditions are chosen so that the fat acid will contain about 15 to 30% by weight of the desired isoamylenes. In order to recover the tertiary isoamylenes thus extracted the fat acid is contacted with a liquid hydrocarbon, either paraffinic, naphthenic, or olefinic in nature, at a temperature avoiding undue polymerization, generally from about 0° to 60° C. or more and preferably about 20° C. to 30° or 40° C. for a period of time of about 1 to 160 minutes, preferably about 10 to 90 minutes. Generally, the ratio of liquid hydrocarbon to fat acid will be about 0.1 to 5 or more:1, preferably about 0.5 to 2:1. These conditions are selected to separate adequate amounts of the desired olefins while avoiding undue polymerization of these components. Higher temperatures improve olefin separation but increase the tendency towards polymerization when other conditions remain constant e.g. contact time. However the amount of olefin separated from the fat acid extract in a given amount of time is improved with better contact between the extract and added liquid hydrocarbon, and with better contact, higher temperatures can be employed without obtaining too much polymerization since a shorter contact period can be used. Thus the factors of time, temperature and efficiency of contact can be varied to obtain adequate $C_5$ olefin recovery without undue polymerization. Under these conditions a lean acid phase and a tertiary isoamylene-containing hydrocarbon phase will be produced with little or no polymerization of the isoamylene taking place. The phases can be separated in any convenient manner, e.g. decantation, and the tertiary isoamylenes distilled from the hydrocarbon phase. The separated lean acid phase can be recycled directly back to the acid extraction unit without the necessity of reconcentration.

The hydrocarbons which we have found to be particularly useful in the isoamylene separation step of the present process are those which are liquid, are substantially inert to the sulfuric acid and the isoamylenes and have a boiling point sufficiently above that of the isoamylenes so that the extracted isoamylenes can be separated therefrom by distillation. It is preferred that the hydrocarbon solvent be a liquid aliphatic saturated compound having a boiling point above about 60° C. and containing at least seven carbon atoms in its molecule, preferably 7 to 10 or 14 carbon atoms, according to availability. Hydrocarbons finding particular utility in the present invention are n-heptane and iso-octane. Other hydrocarbons are, of course, contemplated within the scope of our invention; for example nonane, dodecane, methylcyclohexane, etc. and mixed petroleum fractions. However, no particular advantage has been realized by using the higher boiling hydrocarbons. Aromatics can also be employed if desired but are not preferred since they may become sulfonated.

Two hydrocarbons, n-heptane and iso-octane, were tested as extracting agents under substantially the same conditions. In these tests a stream comprising 505.5 grams normal amylenes and 274 grams of 2-methylbutene-2 was contacted with 600 gms. of 65% by weight sulfuric acid at 20° C. After contact the fat acid contained about 20% 2-methylbutene-2. The resultant fat acid was then contacted with stirring in a four-necked flask with the liquid hydrocarbon extracting agent. The isoamylene-acid phase and the hydrocarbon solvent were added to the flask at 20° C. The phases were separated after 1.5 hours contact time. As seen in Table I below there is very little difference in the relative effectiveness of the two hydrocarbons.

TABLE I

*Comparison of extraction agents*

| Solvent | n-heptane | iso-octane |
|---|---|---|
| Ratio Solvent/iso-$C_5$ Olefin-Acid Phase | 0.67 | 0.68 |
| Percent Isoamylene in Acid | 19.9 | 19.9 |
| Percent Isoamylene in Hydrocarbon Phase Based on Feed | 36.1 | 33.6 |

The temperature at which the hydrocarbon extraction is carried out apparently has a direct effect upon the amount of isoamylenes displaced from the acid phase. More specifically, the higher the extraction temperature the greater the removal from the fat acid. This increasing temperature must, of course, be correlated with the extent of polymerization. We have found that good results can be attained by utilizing temperatures in the range of about 0° to 60° C. It is preferred, however, that the temperature be maintained at about 20° to 40° C. Table II shows the improved extraction when operating at increased temperatures. In these tests the acid and hydrocarbon solvent were added to the flask and then the tertiary isoamylene was added thereto. The conditions of extraction are indicated in the table.

TABLE II

| Hydrocarbon Solvent | n-heptane | n-heptane |
|---|---|---|
| Quantity of Solvent (gms.) | 200.0 | 200.0 |
| Quantity of 65% $H_2SO_4$ (gms.) | 300.0 | 300 |
| Quantity of 2-methylbutene-2 (gms.) | 75.0 | 75 |
| Temperature, ° C. | 20 | 0 |
| Contact Time, Hours | 1.5 | 1.5 |
| Wt. of Fat Acid (final) (gms.) | 342.6 | 356.3 |
| Wt. of Isoamylene in Heptane (gms.) | 32.4 | 18.7 |
| Percent of Total Isoamylene in Heptane | 43.1 | 25.0 |

The optimum time that the hydrocarbon solvent is allowed to remain in contact with the fat acid would, of course, depend upon how long it takes to attain equilibrium between the acid and the hydrocarbon phases. Generally, it has been found that about 1 to 160 minutes will be sufficient with the preferred contact time being in the range of about 10 to 90 minutes. Table III following shows the results of varying the contact time, all other conditions being substantially equal. The isoamylenes absorbed in the sulfuric acid were composed of a mixture of 2-methylbutene-2 and 2-methylbutene-1 in a ratio of about 10:1.

TABLE III

| Run | 1 | 2 | 3 | 4 |
|---|---|---|---|---|
| Conditions: | | | | |
| Time (min.) | 60 | 15 | 30 | 120 |
| Temperature, ° C | 20 | 20 | 20 | 20 |
| Fat Acid: | | | | |
| Weight 65% $H_2SO_4$, gms. | 200.4 | 197.8 | 196.5 | 198.5 |
| Weight isoamylenes absorbed, gms. | 54.4 | 61.9 | 58.1 | 56.9 |
| Total weight, gms. | 254.8 | 259.7 | 254.6 | 255.4 |
| Probable impurities | $1-C_5H_{10}$, $C_5H_{12}$ | $n-C_7H_{16}$ | $n-C_7H_{16}$ | $n-C_7H_{16}$ |
| Solvent: | | | | |
| Weight n-heptane, gms. | 203.0 | 201.7 | 201.0 | 200.1 |
| Weight $i-C_5$=extracted*, gms. | 29.7 | 19.3 | 27.0 | 30.4 |
| Weight Percent $i-C_5$=extracted, gms. | 54.6 | 31.2 | 46.5 | 53.5 |
| Acid recovered, gms. | 225.1 | 240.4 | 227.6 | 225.0 |

*Based on weight loss of acid phase.

As seen from this table, equilibrium appears to have been reached in about 60 minutes.

By using a successive batch extraction of the fat sulfuric acid containing 20% isoamylene, it is estimated that yields of up to about 90% isoamylene can be recovered. For example if the hydrocarbon/iso-olefin-acid ratio is 0.667 two successive extractions will give 73.7% removal of the isoamylene and if the hydrocarbon/iso-olefin-acid ratio is 1.33, one extraction will give 65.2% recovery. It is, of course, possible to use a continuous countercurrent extraction technique of passing the hydrocarbon solvent up through a downflowing stream of fat sulfuric acid if desired.

The following specific examples will serve to illustrate the present invention. Example I describes a typical procedure followed in extracting the tertiary isoamylenes from a $C_5$ blend and Example II shows the recovery of the tertiary isoamylenes from a fat acid extract prepared essentially as described in Example I.

EXAMPLE I

To 201.4 grams of 65% by weight sulfuric acid was added 264.9 grams of a $C_5$ blend. The $C_5$ blend comprised the following weight percent of materials:

2-methylbutene-2 _____ 21.2
2-methylbutene-1 _____ 13.4
2-pentene _____ 26.5
n-pentene _____ 7.5
isopentane _____ 31.3

The above mixture was kept at 20° C. and stirred vigorously in a fluted four-necked flask fitted with a mercury seal stirrer, thermometer and a Dry Ice condenser. The stirring was continued for 30 minutes and then stopped. 15 minutes were allowed for the layers to separate. The acid layer recovered weighed 257.6 grams indicating that 61.1% of the isoamylene in the $C_5$ blend had been absorbed in the acid.

EXAMPLE II 254.8 grams of a fat sulfuric acid extract prepared essentially as described in Example I and containing about 54.4 grams of a mixture of 2-methylbutene-1 and 2-methylbutene-2 was stirred vigorously in a four-necked flask for one hour at 20° C. with 203 grams of n-heptane. A mercury seal stirrer and a Dry Ice condenser were used to minimize the loss. After settling the acid layer weighed 225.1 grams indicating an extraction of 29.7 grams of the tertiary isoamylene from the fat acid or a 54.6% extraction. The isoamylene is separated from the n-heptane by conventional distillation procedures.

EXAMPLE III

The following example shows the use of a temperature of about 38° C. to recover 2-methyl-2-butene in n-heptane hydrocarbon from a mixture including 2-methyl-2-butene, $H_2SO_4$ and n-heptane. The mixture, including 90 grams of technical grade 2-methyl-2-butene, 209 grams of n-heptane and 75 grams of 65 percent by weight sulfuric acid, was stirred vigorously in a 4-necked, fluted flask for 2½ hours at 38° C. A sealed stirrer and a Dry Ice condenser were used to minimize loss. After settling the hydrocarbon layer contained 60.6 grams of the tertiary isoamylene or a 75% recovery. The isoamylene can be separated by conventional distillation procedures.

EXAMPLE IV

Recycle 65% sulfuric acid was added to a $C_5$ blend comprising the following weight percent of materials:

Composition:
| | |
|---|---|
| Butane | 0.1 |
| Butenes | 0.8 |
| i-Pentane | 25.9 |
| n-Pentane | 7.6 |
| 1-pentene | 5.1 |
| 2-pentene | 18.6 |
| Isoamylene | 41.3 |
| Higher boiling | 0.6 |

The sulfuric acid and $C_5$ blend were fed into a primary fluted mixing vessel equipped with a mechanical stirrer and thermometer, were stirred vigorously to provide an acid-hydrocarbon emulsion, and the emulsion was passed to a primary settler vessel in which the acid (now a fat acid) and hydrocarbon phases separated.

The fat acid containing isoamylenes was fed, along with n-heptane, into a secondary fluted mixing vessel equipped with a mechanical stirrer and thermometer. The fat acid and n-heptane solvent were stirred vigorously and were conducted to a secondary settler. After settling the acid layer and n-heptane hydrocarbon layers were separated. The procedure was conducted during a three hour period, and the isoamylene content in the acids was determined by density while the $C_5$ blend, raffinate and fat solvent compositions were determined by vapor phase chromatography. The conditions for each of the primary and secondary mixing vessels are set forth in Table IV.

TABLE IV

| | Conditions | |
|---|---|---|
| | Primary | Secondary |
| Temperature, °F | 68 (20° C.) | 100 (38° C.) |
| Stirring r.p.m. | 3,000 | 3,000 |
| Contact time (min.) | ~10 | ~10 |
| Feed Rates (ml./hr.): | | |
| $C_5HC$ | 285 | |
| Sulfuric Acid | 87 | |
| Solvent ($C_7$) | | 202 |
| Fat Acid | | 125 |

The table below, Table V, shows the equilibrium concentrations in the various streams and the isoamylene material balance.

TABLE V

| | Percent Isoamylene | Grams of Isoamylene |
|---|---|---|
| $C_5HC$ feed | 43.1 | 225 |
| Raffinate | 28.9 | 131 |
| Fat Solvent | 17.5 | 90 |
| Sulfuric Acid | 7.7 | |
| Fat Acid | 24.4 | |

The separation in the primary settler was 40% of the available isoamylene. About 96% of the extracted isoamylene was recovered in the fat solvent. About 3% of the isoamylene dimerized. Analysis of the $C_5$ fraction from the fat solvent gave the following results:

| | Wt. percent |
|---|---|
| Butanes | Trace |
| i-Pentane | 0.5 |
| n-Pentane | 0.2 |
| 1-pentene | 0.1 |
| 2-methyl-1-butene | 5.4 |
| 2-pentene | 0.3 |
| 2-methyl-2-butene | 93.5 |

These results show a 98.9% purity for the isoamylene produced in the extraction process.

EXAMPLE V

This example was conducted in essentially the same manner as Example IV under the following conditions:

| | Conditions | |
|---|---|---|
| | Primary | Secondary |
| Temperature, °F | 50 (10° C.) | 100 (38° C.) |
| Stirring r.p.m. | 3,000 | 3,000 |
| Contact time (min.) | 16.5 | 10.2 |
| Feed Rates (ml./hr.): | | |
| $C_5HC$ | 142 | |
| Sulfuric Acid | 85 | |
| Solvent ($C_7$) | | 208 |
| Fat Acid | | 113 |

The table below, Table VI, shows the equilibrium concentrations of isoamylene in the various streams and the material balance.

TABLE VI

| | Percent Isoamylene | Grams of Isoamylene |
|---|---|---|
| $C_5HC$ feed | 41.8 | 114 |
| Raffinate | 19.8 | 39 |
| Fat solvent | 13.8 | 68 |
| Recycle acid | 5.9 | |
| Fat acid | 20.3 | |

The separation in the primary settler included about 65% of the available isoamylene. About 90% of the isoamylene separated was recovered in the fat solvent.

The final step which recovers the isoamylene from the hydrocarbon solvent is straight forward. Since the hydrocarbon solvent has been selected so that its boiling point is above that of the isoamylenes, the hydrocarbon extract obtained from the hydrocarbon extraction step can be conducted to any conventional distillation apparatus wherein the isoamylenes are distilled overhead and collected as a substantially pure product. The hydrocarbon solvent after removal of the isoamylenes can be recycled back to the hydrocarbon extraction unit for further use.

It is claimed:

1. In a method for recovering isoamylenes selected from the group consisting of 2-methylbutene-1 and 2-methylbutene-2, the steps comprising contacting a tertiary isoamylene-containing hydrocarbon stream which includes other $C_5$ hydrocarbons with sulfuric acid of about 50 to 75% by weight concentration to prepare a fat acid extract, contacting said fat acid extract with a liquid hydrocarbon containing at least 7 carbon atoms, said contact taking place at a temperature of about 0 to 60° C. while avoiding undue polymerization to produce an acid phase and an isoamylene-containing hydrocarbon phase, separating said acid phase from said hydrocarbon phase, and recovering the isoamylene from said hydrocarbon phase by distillation.

2. In a method for recovering isoamylenes selected from the group consisting of 2-methylbutene-1 and 2-methylbutene-2, the steps comprising contacting a tertiary isoamylene-containing hydrocarbon stream which includes other $C_5$ hydrocarbons wtih sulfuric acid of about 50 to 75% by weight concentration to prepare a fat acid extract, contacting said fat extract with a liquid hydrocarbon containing at least 7 carbon atoms, said contact taking place at a temperature from about 0 to 30° C. to produce an acid phase and an isoamylene-containing hydrocarbon phase, separating said acid phase from said hydrocarbon phase, and recovering the isoamylene from said hydrocarbon phase by distillation.

3. A method in accordance with claim 2 wherein the acid phase after contact is recycled to the acid extraction step.

4. A method in accordance with claim 2 wherein the liquid hydrocarbon is n-heptane.

5. In a method for recovering isoamylenes selected from the group consisting of 2-methylbutene-1 and 2-methylbutene-2, the steps comprising contacting a tertiary isoamylene-containing hydrocarbon stream which includes other $C_5$ hydrocarbons with sulfuric acid of about 50 to 75% by weight concentration to prepare a fat acid extract, contacting said fat acid extract with a liquid hydrocarbon having a boiling point sufficiently above that of the isoamylene so that the isoamylene can be removed therefrom by distillation, said contact taking place at a temperature of about 0 to 60° C. while avoiding undue polymerization to produce an acid phase and an isoamylene-containing hydrocarbon phase, separating said acid phase from said hydrocarbon phase, and recovering the isoamylene from said hydrocarbon phase by distillation.

6. In a method for recovering isoamylenes selected from the group consisting of 2-methylbutene-1 and 2-methylbutene-2, the steps comprising contacting a tertiary isoamylene-containing hydrocarbon stream which includes other $C_5$ hydrocarbons with sulfuric acid of about 50 to 75% by weight concentration to prepare a fat acid extract, contacting said fat acid extract with a liquid hydrocarbon having a boiling point sufficiently above that of the isoamylene so that the isoamylene can be removed therefrom by distillation, said contact taking place at a temperature from about 0 to 30° C. to produce an acid phase and an isoamylene-containing hydrocarbon phase, separating said acid phase from said hydrocarbon phase, and recovering the isoamylene from said hydrocarbon phase by distillation.

7. A method in accordance with claim 6 wherein the acid phase after contact is recycled to the acid extraction step.

No references cited.